A. G. KROCKER.
SAW TABLE GAGE.
APPLICATION FILED AUG. 21, 1920.
1,375,159.
Patented Apr. 19, 1921.
3 SHEETS—SHEET 1.
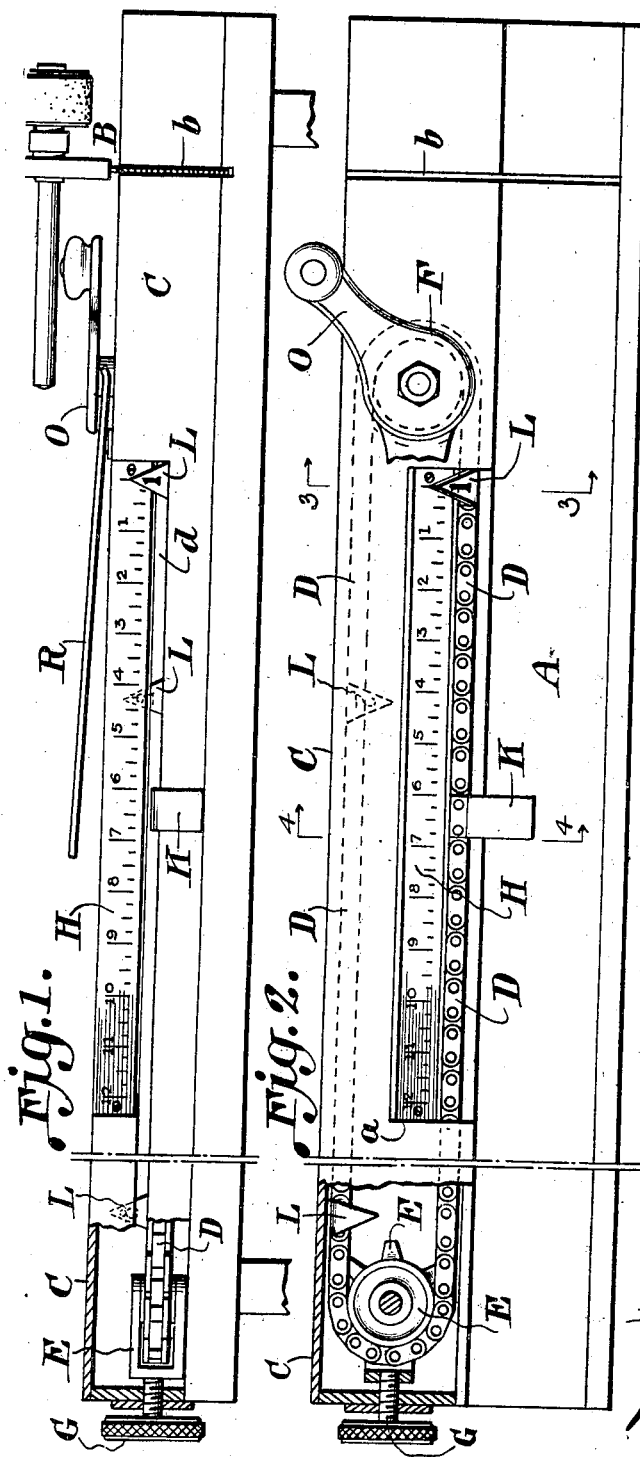
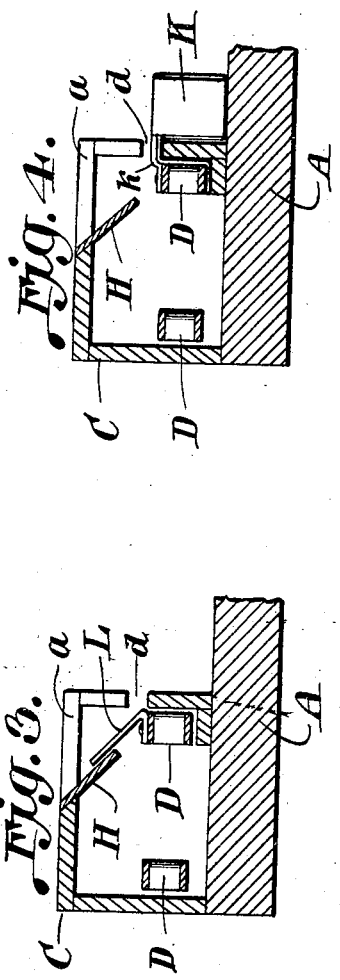
Inventor
Adolf G. Krocker,
by his Attorneys
Baldwin Wight

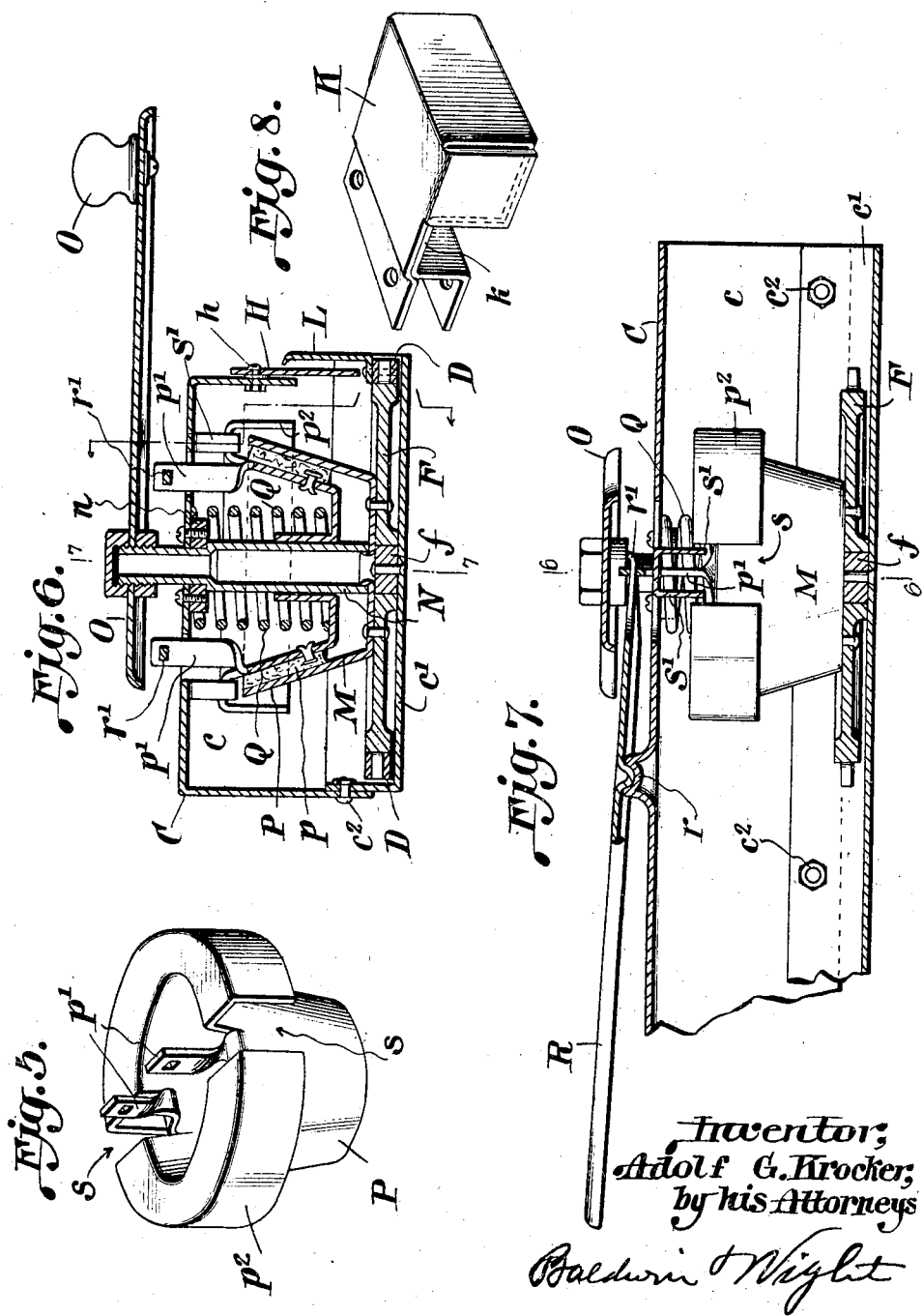

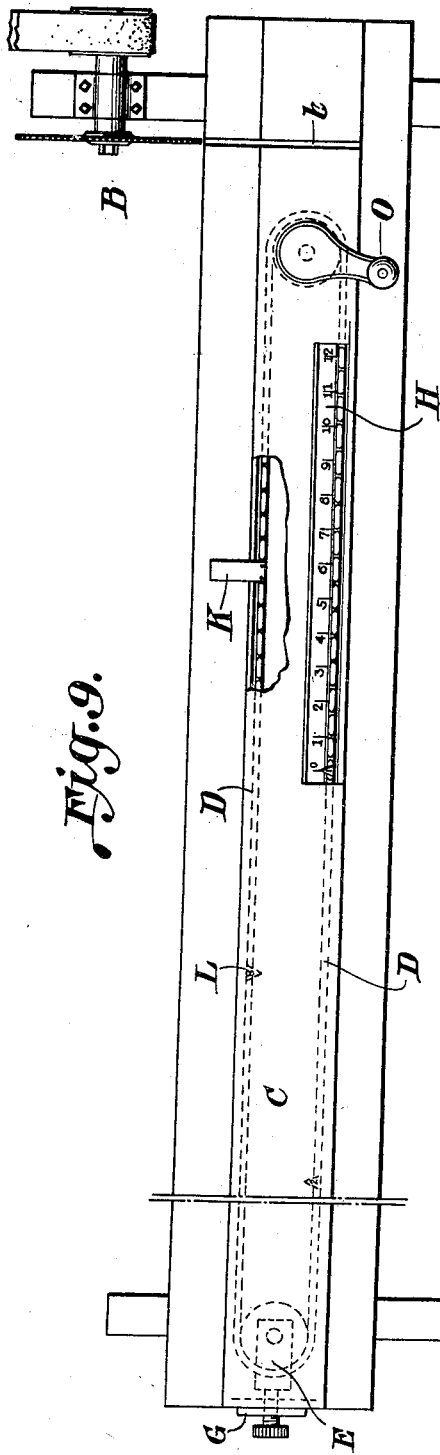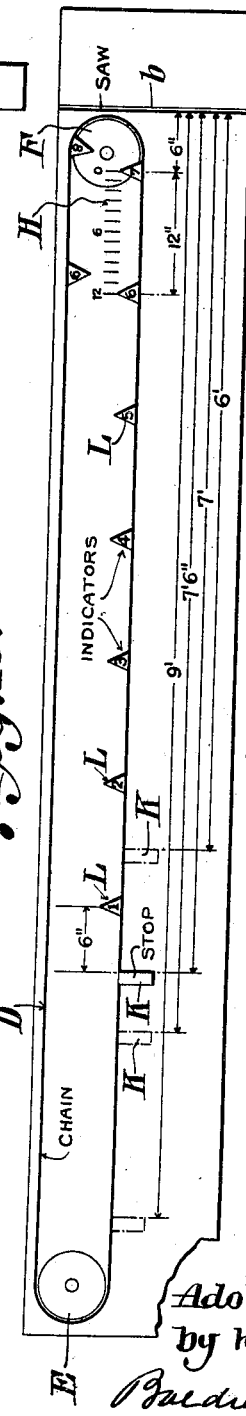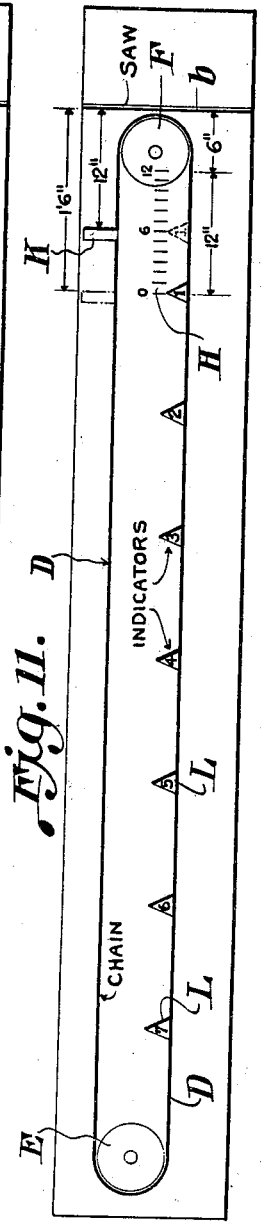

UNITED STATES PATENT OFFICE.

ADOLF G. KROCKER, OF WACO, TEXAS.

SAW-TABLE GAGE.

1,375,159. Specification of Letters Patent. Patented Apr. 19, 1921.

Application filed August 21, 1920. Serial No. 405,079.

*To all whom it may concern:*

Be it known that I, ADOLF G. KROCKER, a citizen of the United States, residing in Waco, in the county of McLennan and State of Texas, have invented certain new and useful Improvements in Saw-Table Gages, of which the following is a specification.

This invention relates to sawing machines used for cutting wood of various kinds and shapes to desired lengths and widths. It is a common practice to set a cutting stop or gage by hand and to measure by hand the required distance of the stop from the saw. This is a slow operation and not always accurate. It has heretofore been proposed to employ devices by means of which a stop or gage may be mechanically set and the distance from the saw to the stop at the same time indicated, but the proposed devices are complicated and so far as I am aware, have not been extensively used.

According to my invention I provide means whereby a stop for the work may be very quickly set the required distance from the saw, such distance being automatically indicated to the operator as he stands near the saw. The operating devices for the gage or stop are within easy reach of the attendant, while the stop may be located any desired distance from him. The devices which I employ may be readily applied to saw-tables of various kinds, whether they are designed to support the work while the latter is moved toward and from a saw mounted to turn about a fixed axis, or to support the work within reach of a saw mounted in a swinging or oscillating frame.

In carrying out my invention I provide an endless chain or band, to which are secured a number of indicators or pointers, and I mount this pointer-carrying chain in a housing, supported on the saw-table. The sprocket wheels about which the chain extends are provided with devices for regulating the tension of the chain and novel devices are employed for turning the chain to the desired extent to move the pointers and to also determine the position of the stop or gage carried by the chain, relatively to the saw. The operating devices comprise a handle, connected with one of the sprocket wheels, and a clutch, operated by a lever by means of which the chain-operating devices may be locked when the adjustments have been made.

The pointers are numbered to indicate feet and their relation with the stop is such that when a pointer bearing a certain number is opposite zero on the scale the distance of the stop from the saw will be known. The scale is mounted in the housing near the chain-operating device. It is preferably 12 inches long and the distance from the zero mark to the saw is preferably 6 inches, in order to leave room between the saw and the zero mark for the operating mechanism. The scale is divided to indicate inches and fractions of an inch, so that by my improvements the distance from the saw to the stop may be indicated with the greatest accuracy in feet, inches and fractions thereof.

My improvements will be hereinafter more fully described. They are illustrated in the accompanying drawings, in which, Figure 1 shows a front elevation of a saw-table with my improvements applied thereto, Fig. 2 is a plan view of the same, Fig. 3 shows a section on the line 3—3 of Fig. 2, Fig. 4 shows a section on the line 4—4 of Fig. 2, Fig. 5 is a perspective view of one of the clutch members of the chain-operating mechanism, Fig. 6 is a sectional view of the chain-operating mechanism, on the line 6—6 of Fig. 7, Fig. 7 is a sectional view of the chain-operating mechanism looking in a different direction, on the line 7—7 of Fig. 6,

Fig. 8 is a perspective view of the stop or gage,

Fig. 9 is a plan view of a modified construction.

In Figs. 1 and 2 the mechanism is adapted to coöperate with a saw, which is moved toward and from the work. In Fig. 9 the arrangement is such that the work may be moved toward and from the saw.

Fig. 10 is a diagram and illustrates how the position of the stop from the saw may be accurately measured and indicated. This diagram illustrates the operation of the mechanism shown in Figs. 1 and 2.

Fig. 11 is a diagram similar to Fig. 10, but showing the operation of the mechanism shown in Fig. 9.

Referring to the first eight figures of the drawings, a saw-table is indicated at A and a saw at B. The saw operates in a slot *b* in the table as usual and in this case the saw is mounted on a swinging frame so as to move toward and from the work. On the table A is a housing C, preferably made of sheet metal, as shown in Figs. 6 and 7, and within the housing is an endless chain or band D, extending around sprocket wheels E and F at opposite ends of the housing. The sprocket wheel E is provided with devices G, by means of which the tension of the chain may be regulated. The housing C, as before stated, is preferably made of sheet metal and comprises an upper member $c$ and a lower member $c'$, bolted together as indicated at $c^2$. Adjacent the sprocket wheel F the housing is cut away, as indicated at $a$, Fig. 4, to receive a scale H, secured to the upper member of the housing as indicated at $h$ in Fig. 6. The housing shown in Figs. 1 to 4 is slightly different from that shown in Figs. 6 and 7. In the latter case the housing is made of sheet metal, while in Figs. 1 to 4 it is shown as being constructed of wood. In Figs. 6 and 7 the scale is arranged vertically, while in Figs. 1 to 4 it is inclined.

The stop K is secured to the chain and projects laterally therefrom. It is preferably made of sheet metal, bent to shape as indicated in Fig. 8, and is secured to the chain in the manner shown in Fig. 4. The chain also carries a series of indicators or pointers L, arranged at regular distances from the stop, the first pointer marked "1" being preferably arranged at exactly 6 inches from the stop and the pointers are arranged 12 inches from each other. The zero mark on the scale H is preferably located 6 inches from the saw slot $b$ and the numbers on the scale read from right to left. The precise arrangement shown is not essential, but is preferred. In the system illustrated, when pointer No. 1 is opposite the zero mark on the scale it will be known that the stop is exactly 6 inches from the zero mark, which added to the 6 inches from the zero mark to the saw slot $b$ will indicate that the stop is exactly one foot from the saw. The same rule applies when the other indicators or pointers are brought to the zero mark, it being remembered that the pointers in the arrangements shown are one foot or 12 inches apart and that the first pointer is 6 inches from the stop and that 6 inches must always be added to cover the distance from the zero mark to the saw slot $b$, the first pointer being 6 inches from the stop, and the zero mark on the scale being 6 inches from the saw slot, the stop will be properly placed the exact distance required from the slot and this distance will be conveniently indicated on the scale. For instance, when indicator number 1 is at the zero mark on the scale, it will be just 6 inches from the saw slot in the table, but the stop will be 6 inches farther off. The indicator displays number 1 indicating that the stop is just one foot from the saw slot. The same rule applies for other measurements. This system is clearly indicated in Fig. 10 where the stop is shown as being located 7 feet from the saw slot although the pointer marked 7 is located 6 inches from this slot.

In order to operate the chain and set the pointers mechanically I preferably employ the devices shown in Figs. 5, 6 and 7, where as appears, the sprocket wheel F is attached to a cup-shaped clutch-member M, in turn secured to a post N, extending through a bearing $n$ in the top of the casing and secured to a handle O, by means of which the post and the wheel may be rotated. The sprocket wheel F revolves around a bearing F, secured to the lower member of the housing. The wheel F is normally held against rotation by a frustum-shaped clutch-member P, having a leather facing $p$, which engages the interior of the member M. The member P is normally forced against the member M by a coiled spring Q, which surrounds the post N. The member P is raised by means of a lever R, fulcrumed at $r$ on the housing and having a bifurcated end, the arms $r'$ of which engage the upwardly extending arms $p'$ of the member P. By depressing the outer end of the lever R the member P may be disengaged from the member M and the sprocket wheel may be turned by means of the hand-lever O. In this way the position of the stop may be changed at will. In order to hold the member P against rotation I form openings $s$ in the overlying portion $p^2$ of the member P, into which project arms $s'$, formed by cutting out and turning down portions of the upper housing.

By these devices the stop-carrying chain is firmly locked in adjusted positions and may be quickly unlocked and operated when desired. The chain and the operating mechanism are protected by the housing shown and it will be observed, by reference to Fig. 3 that the indicators L are inclined and operate over the scale H, which is also inclined, being therefore plainly visible to the attendant. As shown in Fig. 4 the stop K is supported over the table, close to the front of the housing, having a portion $k$ which extends through a slot $d$ in the housing and rides on the lower edge of this slot. In Fig. 9 I have shown how my invention may be applied to a saw-cutting table in which the saw is mounted to move about a fixed axis and where the work is moved toward the saw. The construction is practically the same as before described. In this case, however, the stop K operates on the rear side of the housing and the indicators L are suitably numbered. The scale H in this case has the numbers reversed, reading from left to right. The distance from the end of the scale to the slot *b* remains at 6 inches, otherwise the mechanism is substantially the same as that before described.

When adjusting the stop after a previous adjustment, it is first necessary to unlock the clutch-member which, as before stated, holds the stop and pointers in adjusted position. In order to separate the clutch-members the outer end of the lever R is depressed. This withdraws the clutch-member P from the clutch-member M and when this is done the handle O may be operated to move the chains to the desired extent, bringing the pointers and stops to the desired positions. After adjustment is properly made, the lever R is released, the clutch-member is engaged and thereafter the stops and pointers remain in fixed position.

Referring to Fig. 10 I have shown diagrammatically how the mechanism is operated to set the stop for different distances. This is made clear by the drawing itself and need not be further described.

Fig. 11 is a diagram illustrating how the mechanism shown in Fig. 9 may be set to operate the stop at varying distances. Further explanation of this diagram is unnecessary.

These diagrams, however, show that the stop may be set to cut material to the exact length or width desired. The mechanism may be readily applied to saw-tables of various constructions, either where the saw is mounted to swing toward and from the work or where the work is moved toward the saw. The operator may stand in one place to perform all the operations, being able to cut miscellaneous lengths without changing his position and these lengths may be accurately determined in feet, inches or fractions thereof. In this way a great saving of lumber or material is effected. The mechanism is suitable for use on rough crating material, where speed is of prime importance and also in connection with the finest cabinet work, requiring the greatest degree of accuracy.

I claim as my invention:

1. Gage mechanism for saw-tables comprising an endless band, a stop carried thereby, a series of pointers carried by the band, a scale coöperating with the pointers and stop and means for operating the band.

2. Gage mechanism for saw-tables comprising an endless band, a stop carried thereby, a series of pointers carried by the band arranged regular distances from each other and from the stop, a scale coöperating with the pointers and means for operating the band.

3. Gage mechanism for saw-tables comprising a housing, an endless band within the housing, a stop carried thereby, a series of inwardly inclined pointers carried by the band, an inclined scale coöperating with the pointers and the stop and means for operating the band.

4. Gage mechanism for saw-tables comprising a housing having a longitudinal slot in its front face, an endless band within the housing, a stop carried by the band and having a portion extending through the slot in the housing and a portion outside the housing, a series of pointers carried by the band, a scale coöperating with the pointers and the stop and means for operating the band.

5. Gage mechanism for saw-tables comprising an endless band, a stop carried thereby, a series of pointers carried by the band, a scale coöperating with the pointers and the stop and means for operating the band comprising a handle operatively connected with the band, a clutch-member connected with the handle, a clutch-member connected with the band and a lever for shifting the last-mentioned clutch-member.

6. Gage mechanism for saw-tables comprising an endless chain, sprocket wheels which the chain engages, a stop carried by the chain, a series of pointers carried by the chain, a scale coöperating with the pointers and stop and means for operating the chain comprising a clutch-member connected with one of the sprocket wheels, a handle connected with said clutch-member for turning the sprocket wheel and the chain, a clutch-member engaging the clutch-member first mentioned, a spring for holding said clutch-members in engagement and a lever for disengaging the clutch-members.

In testimony whereof, I have hereunto subscribed my name.

ADOLF G. KROCKER.